June 2, 1931.  A. F. PIEPER ET AL  1,808,176
STEREOSCOPIC VIEW BOX
Filed Oct. 24, 1927  4 Sheets-Sheet 3

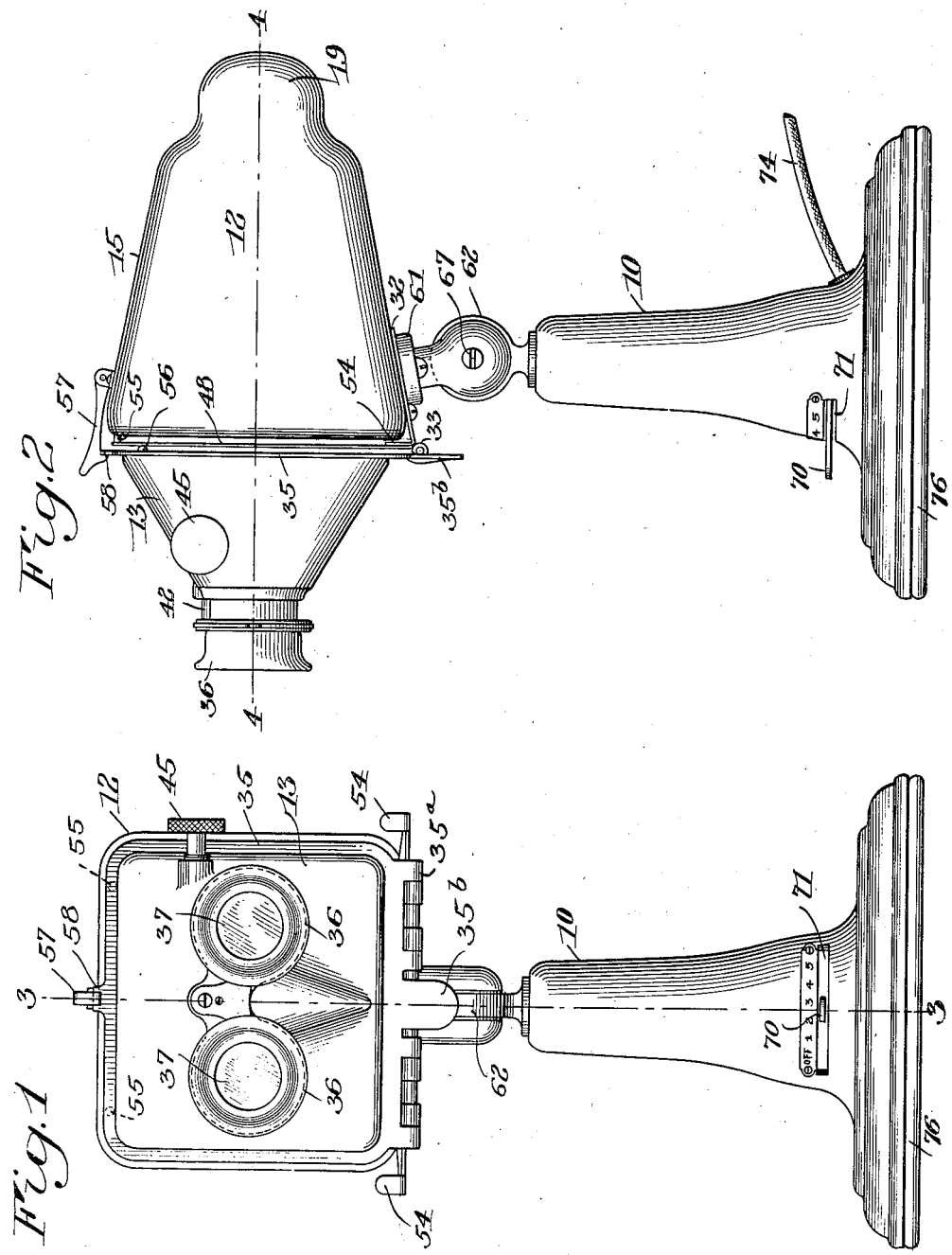

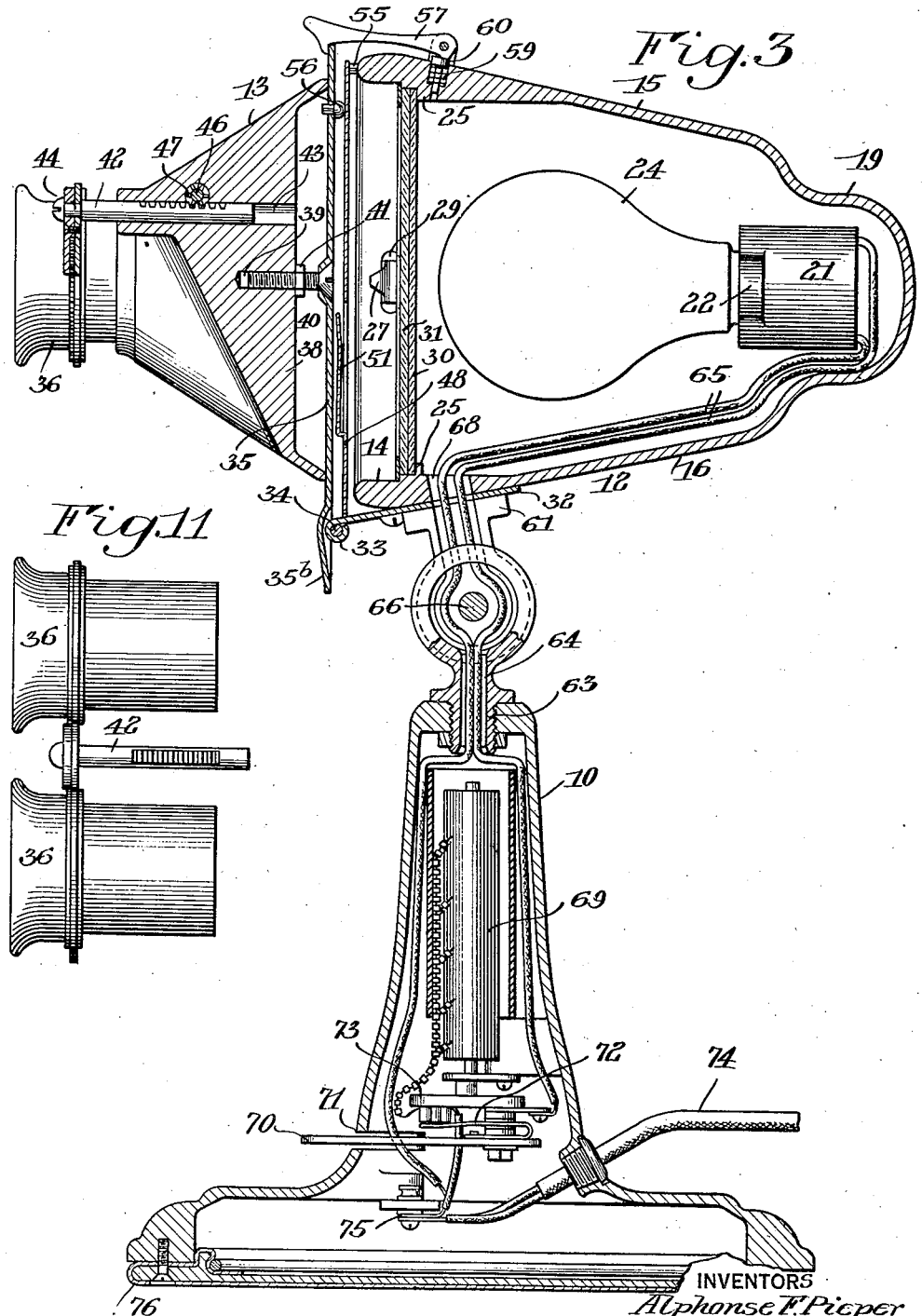

INVENTORS
Alphonse F. Pieper
BY George I. Kester
their ATTORNEYS

June 2, 1931. A. F. PIEPER ET AL 1,808,176
STEREOSCOPIC VIEW BOX
Filed Oct. 24, 1927 4 Sheets-Sheet 4
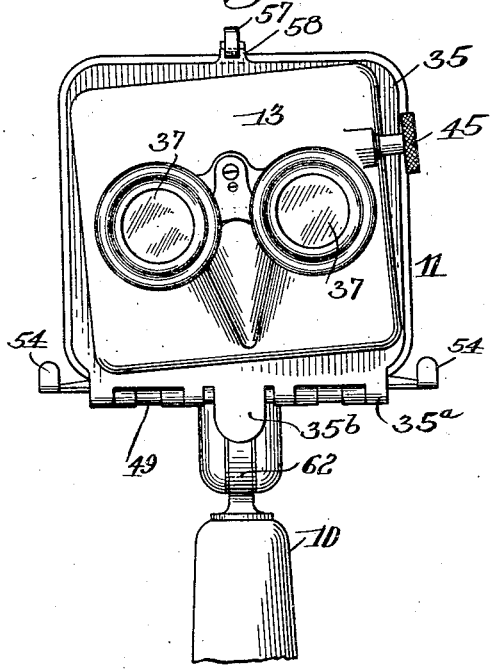
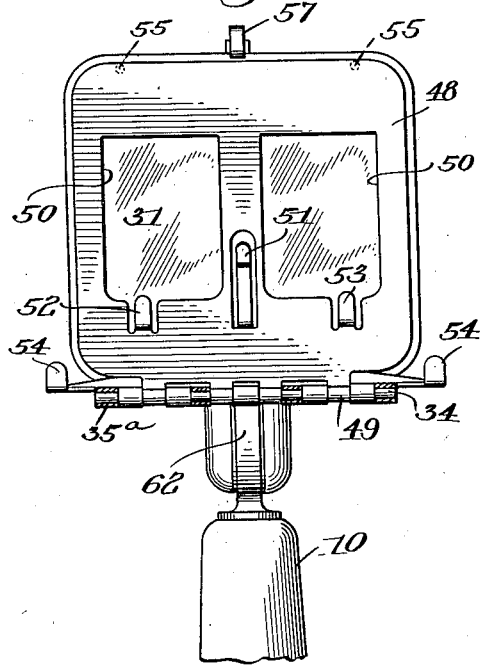
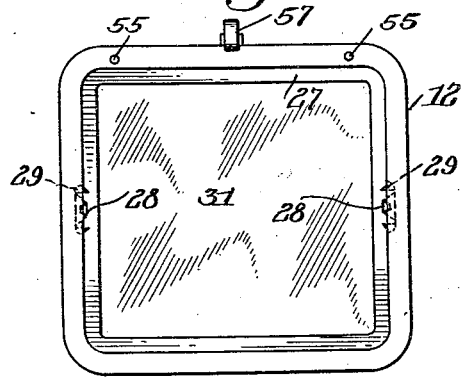
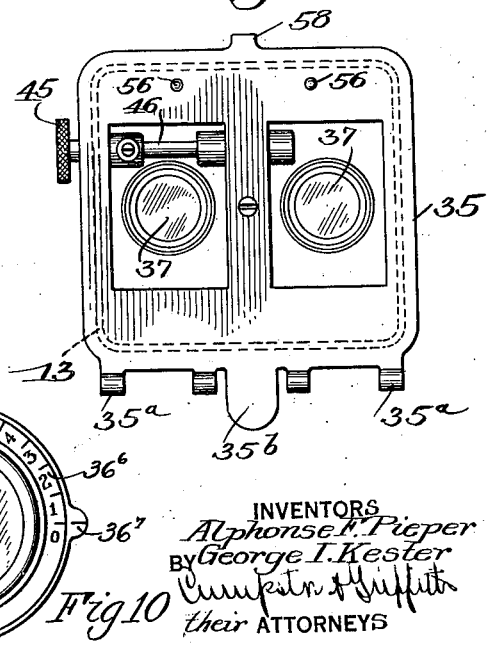
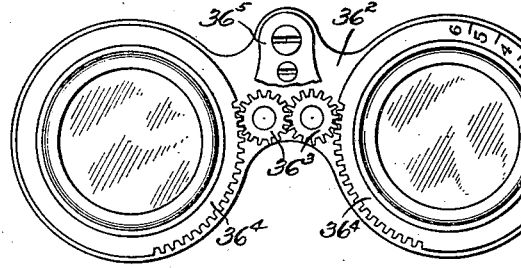
INVENTORS
Alphonse F. Pieper
By George I. Kester
their ATTORNEYS Patented June 2, 1931

1,808,176

UNITED STATES PATENT OFFICE

ALPHONSE F. PIEPER AND GEORGE I. KESTER, OF ROCHESTER, NEW YORK; SAID KESTER ASSIGNOR TO SAID PIEPER

STEREOSCOPIC VIEW BOX

Application filed October 24, 1927. Serial No. 228,260.

This invention relates to stereoscopic view boxes and more particularly to view boxes for viewing image bearing transparencies or the like such for example as photographic films or plates, one object of the invention being to provide an efficient and compact device of this character of comparatively simple and inexpensive form, convenient to adjust and operate.

Another object is the provision of a device of this character which is adapted for viewing photographic films or plates before a source of light with or without stereoscopic lenses.

Another object is the provision of means for obtaining ready accommodation of the images to the eyes.

A further object is the provision of a device of this nature which is adapted for viewing films or plates of different sizes.

Still a further object is the provision of an illuminating arrangement having an efficient arrangement of lamp with reflection and light modifying elements combined so as to best simulate daylight.

To these and other ends the invention resides in certain improvements and combinations of parts, all as will be hereinafter more fully described, the novel features being pointed out in the claims at the end of the specification.

In the drawings:

Fig. 1 is a front elevation of a device embodying the invention.

Fig. 2 is a side elevation of the same.

Fig. 3 is a sectional elevation taken substantially on line 3—3 of Fig. 1.

Fig. 6 is a partial front elevation similar to Fig. 1 but showing the lens housing moved to an angular position about a horizontal axis.

Fig. 7 is a partial front view of the device with the lens housing removed and showing the hinged supporting plate for photographic film or plates.

Fig. 8 is a view similar to Fig. 7 but with the hinged plate removed and illustrating the means for securing a glass plate at the front of the lamp housing.

Fig. 9 is a detail view of the lens housing viewed from the rear or toward the left of Fig. 2.

Fig. 10 is a detail front view of the lens mounts with the lens retaining rings removed and certain parts broken away to illustrate the means for rotating the lenses to assist the convergence of the eyes.

Fig. 11 is a detail plan view of the lens mounts removed from their housing.

Similar reference numerals throughout the several views indicate the same parts.

Figure 4:
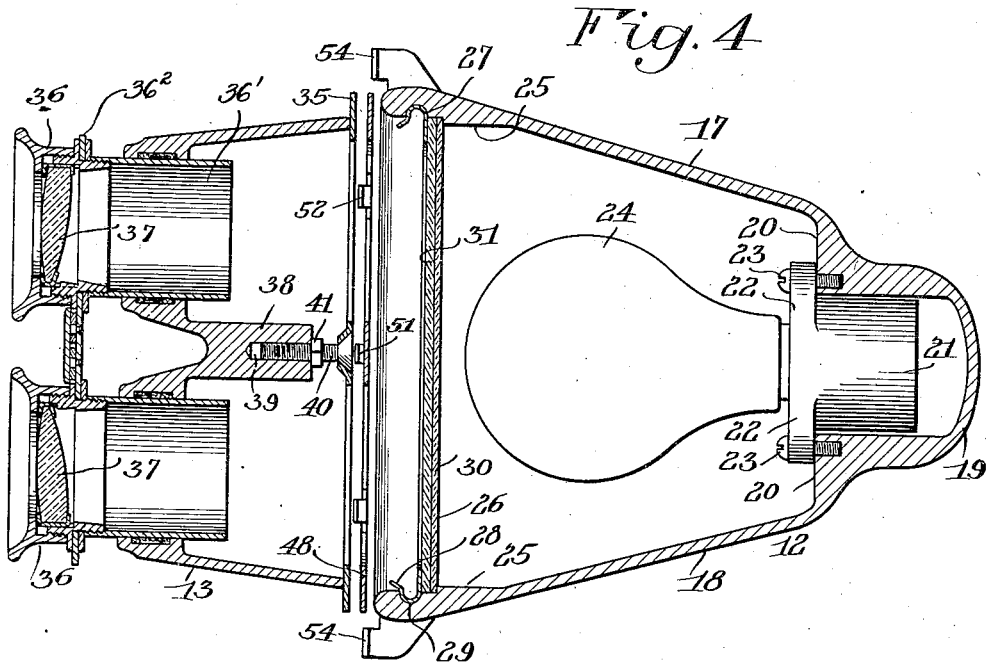
Fig. 4 is a horizontal sectional view taken on line 4—4 of Fig. 2.
Figure 5:
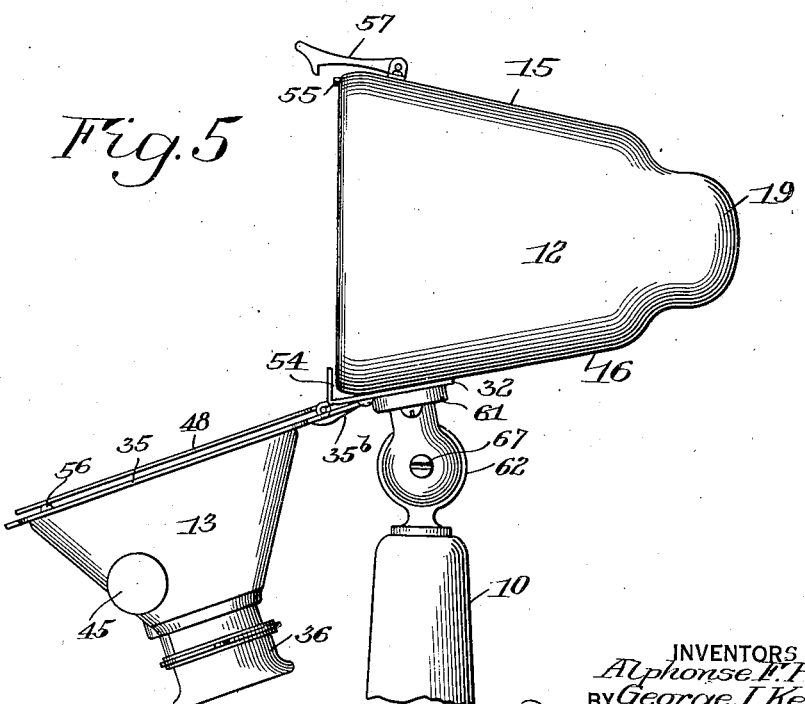
Fig. 5 is a view in side elevation showing the lens housing swung to its lower position.

The present embodiment of the invention provides a device of the class described which is particularly useful for the examination of X-ray films and more especially of X-ray views of the teeth, although the device is applicable as well to the viewing of other types of photographs and films. To this end the invention is embodied in a lamp housing and film holder associated therewith combined with a stereoscopic lens means in the form of a simple unitary attachment, convenient to focus, for viewing a stereoscopic film which is illuminated from the lamp housing.

Referring more particularly to the drawings, there is shown a hollow pedestal base or support 10 having a view box 11 hinged thereto which comprises a lamp housing 12 and a lens housing 13 connected thereto.

The lamp housing is preferably formed from a roughly box-shaped casting having a rectangular opening 14 at the front thereof. The top and bottom 15 and 16, and sides 17 and 18, taper toward the rear of the housing and terminate in a restricted rounded end 19. On the interior of the housing and adjacent the restricted end portion, a pair of shoulders 20, 20 are formed on the sides 17 and 18. A socket member 21 for an electric light bulb is positioned within the hollow end 19 and is provided with lugs 22 which are secured to the shoulders 20 as by means of screws 23. An electric light bulb or lamp 24 is screwed into the socket 21 and extends into the central part of the housing 12.

At the front part of the housing 12 on the interior of the walls are provided suitable shoulders 25 against which a light modifying element 26 is held as by means of a retaining frame 27. The retaining frame 27 is held in position by providing bent ears 28 at the sides thereof which are adapted to enter into notches 29 on the inner side of walls 17 and 18. The frame 27 being resilient, the ears 28 will enter the notches 29 with a snap-fastening action. The light modifying element 26 preferably comprises an inner plate of bluish tinted glass 30 and an outer plate of glass 31 having one side frosted or enameled, the composite result of the two plates of glass being a diffused illumination simulating daylight when the rays of the lamp 24 are viewed therethrough.

The lamp 24 is preferably frosted or enameled and the interior of the compartment 12 is preferably covered with a suitable white enamel, for more effectively projecting a uniform and diffused light through the glass plates.

At the under side 16 of the compartment 12 is secured a metal plate 32 which projects outwardly beyond the plane of the front of the compartment 12 and terminates in hinge portions 33 which support at spaced points a pivot rod 34, forming a supporting means for parts hereafter described.

Means are provided for supporting the lens housing so that it may be moved into and out of operative relation to the film holder and lamp housing. In the present instance the lens housing is pivotally mounted with respect to the lamp housing 12. For obtaining this result the housing 13 is mounted on an apertured frame or plate 35 having at its lower edge hinge portions 35$^a$ which engage the pivot rod 34 at points adjacent the hinge portions 33 which support rod 34 on the housing 12.

The lens housing 13 comprises a hollow box-like casting which supports the tubular lens mounts 36 provided with lenses 37. The housing is formed with a central partition 38 which lies between the optical axes of the lenses and is provided with a threaded aperture 39 in its front edge for the reception of a bolt 40 for pivotally connecting the lens housing to the frame or plate 35, so as to permit it to be pivotally adjusted thereon about an axis lying between the optical axes. A countersunk hole is formed in the central part of frame 35 for the reception of the head of bolt 40 which is correspondingly shaped. A lock nut 41 is preferably provided for securing the bolt 40 in proper position with relation to the frame 35 and partition 38.

It is apparent, therefore, from the mechanism just described, that the lens housing is mounted on the lamp housing to swing from an upper operative position to a lower inoperative position, and also that the lens housing may be tilted on the plate 35 so as to rotate the optical axes about an axis lying therebetween.

Means are provided for limiting the downward swinging movement of the lens housing which comprises a projection 35$^b$ formed on the lower edge of the plate 35 and depending below the pivot rod 34. When the lens housing is swung downwardly to a position approximately at right angles to the front of the lamp housing the projection 35$^b$ strikes the under side of the housing thus preventing further swinging of the plate and the lens housing thereon.

Means are provided for obtaining a focusing movement of the lenses with relation to the lens housing. This focusing movement is effected in the present instance by slidably mounting the tubular lens mounts for axial movement in the housing and providing rack and pinion means between the mounts and housing for controlling such movement. For this purpose a rack bar 42 is slidably mounted in a guide way 43 in the partition wall 38 of the housing 13 and is suitably connected to the lens mounts as shown at 44. (See Fig. 3.) For moving the rack in its guideway 43 there is provided a knob 45 fixed on the end of a shaft 46 which is journalled in the housing 13 and carrying at its inner end a pinion 47 which meshes with the above mentioned rack 42. It is apparent that rotation of the knob 45 will actuate the lens mounts for inward or outward movement for properly focusing the lenses.

The lenses 37 are preferably of the so-called prism type, being formed from semi-double-convex lenses whose focal length is substantially equal to the depth of the lens housing 13.

Mechanism is provided for assisting the eyes in bringing the stereoscopic views into vertical alignment or coincidence in the event that they are not properly spaced in the holder. For this purpose the lenses are secured in fixed position within the lens tubes 36$^1$ and the latter are rotatably supported in the housing 13. While the lens tubes could be arranged for independent rotation, if desired, they are preferably each provided with mechanism by means of which they are caused to rotate in synchronism in opposite directions, that is, one lens will be rotated clockwise and the other counter-clockwise. This mechanism comprises preferably a plate 36$^2$ having apertures within which the tubes 36$^1$ are adapted to freely turn, and the plate has mounted thereon a pair of intermeshing pinions 36$^3$ which mesh respectively with gear teeth on rings 36⁴ secured to the lens tubes. Thus when either lens tube is rotated the other will rotate in synchonism therewith. A suitable guard plate 36⁵ for the pinions 36³ is secured to the plate 36² and effectively covers the pinions to thus protect them and give the lens housing a neat, finished appearance.

A scale is preferably provided in connection with the rotary lenses to indicate their relative angular position with respect to each other. For this purpose one of the rings 36⁴ is marked or engraved at 36⁶ with graduations of any desired unit and the plate 36² has a projection 36⁷ with a mark thereon which serves as a reference point for the scale. When the lenses are rotated from the position "0" toward the position "6" on the scale, as shown in Fig. 10, the images of the stereoscopic views will move toward the right in the left hand lens and toward the left in the right hand lens. Thus if the views are spaced so far apart that the eyes of the operator are not able to converge sufficiently to bring them into coincidence, they may be brought into such relation by rotating the lenses away from the zero position to a greater or less extent to suit the eyes of the operator.

Film holding means are provided for positioning the film in proper relation to the lenses and in front of the light source. This means may assume various forms, but in the present instance there is provided an apertured frame or plate 48 having film engaging means thereon and being mounted for movement from operative to inoperative position with respect to the light source. The frame 48 is preferably provided with hinge portions 49 at its lower edge which engage the pivot rod 34 at points thereon left vacant by the other hinge portions 33 and 35ª. The plate 48, as best seen in Figs. 3, 4 and 7, is formed with a pair of openings 50 which may be slightly larger than the films to be observed and have their centers on approximately the optical axes of the lenses. The film engaging means comprises a central clip 51 and side clips 52 and 53 which are herein shown as formed integrally with plate 48 by cutting out and bending portions thereof in a manner which is well known.

An auxiliary film holding means is provided for supporting larger sized films in front of the lamp housing. This means, in the present embodiment, is shown as a pair of upturned fingers 54 formed at the outer ends of plate 32, as shown in Figs. 1 and 4. When a larger film is to be viewed, the lens housing and plate 48 are swung downwardly from in front of the lamp housing and the film is then inserted between the front of the housing and the upturned fingers 54.

The plate 48 and frame 35 are preferably spaced apart and held in proper parallel relation to the glass plates in the lamp housing. For this purpose there is shown a pair of pins 55 secured on the front edge of the housing 12 with which the plate 48 contacts, and a pair of pins 56 secured in frame 35 for contacting plate 48 on the opposite sides from the pins 55. This spacing insures the proper positioning of the parts even though the films may for any reason be of unequal thickness, and also provides a certain amount of ventilation to carry away excess heat from the lamp housing.

The lens holder can be locked in its operative position by means of a latch 57 pivotally mounted at the top of housing 12 and adapted to engage an upwardly extending portion 58 on the frame 35. The latch 57 is suitably spring-pressed downwardly at its outer or engaging end by means of a spring 59 and plunger 60, positioned in a recess in the housing 12 and bearing upwardly on the rear end of the latch on the other side of its pivot from the engaging end.

As heretofore brought out, the view box 11 is pivotally supported on the base 10 so that the operator may incline the device at any angle which suits his convenience. For this purpose there is shown a pair of hollow hinge brackets 61 which are suitably secured to the lower side 16 of the housing 12. The lower ends of brackets 61 are rounded and engage between them a hinge element 62 which is screw threaded at 63 into the upper end of the base 10. The hinge element 62 is formed with a central aperture 64 for the accommodation of insulated conductor wires 65, and is pivotally connected between the brackets 61 by means of a pivot rod 66. The pivot rod is secured in place by means of screws 67 secured in a threaded opening at each end of the rod 66, the heads of the screws contacting respectively the two brackets 61. This form of hinge, as shown in Fig. 3, effectively houses, protects and conceals the electrical connection and preserves the attractive simplicity of outline of the support.

Adjacent the point of attachment of the hinge brackets 61 is formed an aperture 68 in the housing 12 to accommodate the conductor wires 65. The wires are secured at their ends in the usual manner to the socket 21 and pass outwardly of the casing through the aperture 68 and through the hollow hinge element and down into the hollow base 10 where they are connected to a resistance rheostat 69 for varying the brightness of the lamp 24. A switch lever 70 for controlling the rheostat projects through a slot 71 near the bottom of the base 10 and controls the position of a contact member 72 which may be moved to selectively engage the contacts 73 for controlling the various resistance elements of the rheostat in a manner which is well understood. A lead wire 74 coming from any suitable source of current is connected within the base at 75 to the rheostat element.

The lower side of the base 10 is preferably provided with a suitable pad element generally designated at 76.

In the use and operation of the device, a pair of complementary stereoscopic films is secured on the plate 48 by means of the clips 51 and 53, each film occupying a position in front of one of the apertures 50. The lens housing is swung to its upper position and engaged by the latch 57 so that the parts will be positioned as seen in Fig. 3. The current is then turned on and the lamp 24 is adjusted by the rheostat to the desired brightness. It will be noted that the light from the lamp 24 will pass through the glass plates 30 and 31 and through the films supported on the apertured plate 48.

The films are then viewed through the lenses by the operator assisted by the efficient illumination from the lamp housing and if desired by the adjustment of the intensity of the same. The lenses will be adjusted outwardly or inwardly to obtain the desired focusing effect, and in case the films are not symmetrically disposed in the holder or on their mounting card so that the convergence of the eyes is interfered with, the lens housing 13 may be tiltably adjusted about its pivot bolt 40 as indicated in Fig. 6. This adjustment will move the corresponding images relatively to each other in a vertical direction until they are brought to alignment in the same horizontal plane after which they can be brought into coincidence by rotating the lenses in one direction or the other as previously described.

When the two images are thus brought into coincidence and focused, a stereoscopic view of the parts will be obtained in which the details to be observed will stand out in sharp relief. The observer can in this manner bring any desired unit area of the corresponding films into sharp focus for a careful and detailed examination of such area.

If the operator desires to view the films without the aid of the lenses 37, he simply unlatches the lens housing and allows the same to swing downward. The plate 48, which supports the film, is mounted independently on the pivot rod 34 so it will remain in place when the lens holder is swung downwardly.

If it is desired to view a larger film, both the lens housing and the plate 48 will be swung downwardly out of the way and the larger film will be supported before the light source on the upwardly bent fingers 54 as previously explained.

In case it is desirable for any reason to view the films by daylight, the lamp housing may be tilted rearwardly on the pivot 66 to or beyond a vertical position. The operator may then hold the plate 48, containing the films, against the lens housing with his fingers while he views the films against the light from the sky or any other convenient source.

The invention thus provides a simple and efficient apparatus for viewing films or plates which is easy to adjust and operate and which is adapted for effectively viewing films or plates under a variety of conditions. Various modifications may be made in the stereoscopic apparatus herein shown while retaining all of the advantageous principles involved, and it is to be understood that the present embodiment is to be taken as illustrative and not restrictive, reference being had to the appended claims to indicate the scope of the invention.

We claim as our invention:

1. In a device of the class described, a lamp housing, stereoscopic lens means adjacent thereto, means intermediate said housing and lens means for holding films or the like, and means providing for relative aligning movement between said lens means and said film holding means one in a plane substantially parallel to the other and about an axis while each remains in its normal plane of operation whereby to simultaneously align the optical axes with corresponding points on the films.

2. In a device of the class described, a lamp housing, stereoscopic lens means adjacent thereto, means on the housing for holding films, means supported by the housing providing for relative aligning movement between said lens means and said film holding means one about an axis transverse to and intersecting the plane of the other, and means permitting movement of said lens means into and out of operative position with relation to said film holding means.

3. In a device of the class described, a lamp housing, a stereoscopic lens housing adjacent thereto, means intermediate said housings for holding films and the like, means providing for tilting movement of said lens housing relatively to said film holding means, to shift the optical axes into alignment with corresponding points on the films, and means permitting movement of said lens housing independent of the tilting movement into and out of position opposite said film holding means.

4. In a device of the class described, a film holding means for supporting stereoscopic films before a source of illumination, stereoscopic lenses supported in operative relation to said holding means, arranged to be rotated as a unit about an axis transverse to and intersecting the plane of the films and means for rotating one of said lenses about its optical axis through rotation of the other and relatively to said film holding means to shift the image in one lens relatively to the image in the other lens.

5. In a device of the class described, a film holding means for supporting stereoscopic films before a source of illumination, a housing, stereoscopic lenses supported by the housing in operative relation to said holding means, means permitting rotation of the housing about an axis intersecting the plane of the films and rotary means for producing relative rotation between said lenses to thereby shift the image in one relatively to the image in the other without varying the distance between the optical axes.

6. In a device of the class described, a film holding means for supporting stereoscopic films before a source of illumination, stereoscopic lenses supported in operative relation to said holding means and arranged for a tilting movement to bring the optical axes into alignment with corresponding points on the films, and means for synchronously rotating said lenses relatively to each other in opposite directions about their optical axes whereby the images therein can be brought into vertical alignment.

7. In a device of the class described, a film holding means for supporting stereoscopic films before a source of illumination, stereoscopic lens means supported in operative relation to said holding means, means providing for relative aligning movement between said lens means and said film holding means for aligning the optical axes with corresponding points on the films, means for varying the distance between said lens means and the film holder for focusing said films, and means for producing relative rotation of the individual lenses of said lens means by moving one about its optical axes to shift the images relatively to each other.

8. In a device of the class described, a lamp housing, a stereoscopic lens housing, a support for the lens housing pivotally mounted with relation to the lamp housing to swing into and out of normal operative position, a pivot member connecting the lens housing with the support and permitting said lens housing to be rocked upon the support, and film holding means interposed between said housings.

9. In a device of the class described, a lamp housing, a stereoscopic lens housing, a film holding plate, and common pivot means for supporting said lens housing and said plate on said lamp housing to permit them to swing into and out of operative position relatively to said lamp housing.

10. In a device of the class described, a lamp housing, a lens housing, a frame to which said lens housing is connected for axial tilting movement thereon, a film holding plate, and common pivot means for supporting said frame and plate on said lamp housing to permit them to be swung into and out of operative position relatively to said lamp housing.

11. In a device of the class described, a support, means on said support for holding a films to be viewed against a suitable source of illumination, a lens housing on said support, and stereoscopic lenses in said housing, said lens housing being mounted on said support for adjustment thereon about an axis intersecting the plane of the films to properly align the optical axes with the films.

12. In a device of the class described, a support, means on said support for holding films to be viewed against a source of illumination, a lens housing on said support, and stereoscopic lenses in said housing, said lens housing having a pivotal movement as a unit about an axis lying between the optical axes of the lenses for aligning said axes with the films.

13. In a device of the class described, a support, means on said support for holding films to be viewed against a source of illumination, a lens housing on said support, stereoscopic lenses in said housing, said lens housing having a pivotal movement relative to said film holding means when in normal operating position for aligning the optical axes of the lenses with the films, and means for moving said lens housing into and out of alignment with said film holding means.

14. In a device of the class described, a support, an apertured film supporting plate, a frame, said plate and frame each being pivotally mounted on said support for movement one relative to another, stereoscopic lens means carried by said frame and operatively positioned relatively to said film supporting plate, and means for pivotally adjusting said lens means on said frame for aligning the optical axes of the lenses with the films.

15. In a device of the class described, a lamp housing, a base, means for pivotally mounting said housing on said base to rock about a horizontal axis, said housing having an opening, means for supporting films in front of said opening, and a lens carrying housing secured to and alined with said lamp housing for a tilting movement in its normal plane of operation to adjust the lenses into proper relation with the films.

16. In a device of the class described, a frame, a stereoscopic lens carrying housing having a wall positioned between the optical axes of the lenses, and a pivot bolt connecting said frame and wall and permitting the housing to be oscillated upon the frame.

17. In a device of the class described, a support, a frame pivoted thereon, a stereoscopic lens carrying housing, a partition wall on said housing between the optical axes of the lenses, and a bolt extending laterally from the frame and pivotally connecting said frame to said partition wall.

18. In a device of the class described, a support, a frame pivoted thereon, a stereoscopic lens housing, a pivot bolt connecting said frame and housing to permit adjustment of the housing upon the frame, lens tubes adjustable longitudinally in said housing, and means for extending and retracting said tubes.

19. In a device of the class described, a lamp housing, a film holding plate, a lens holder, said plate and lens holder being pivotally mounted on said housing for separate swinging movements each into and out of operative position with relation to said housing, and auxiliary means for supporting a film on said housing without movement of the housing.

20. In a device of the class described, a lamp housing, a lens holder, said lens holder being pivotally mounted on said housing to swing into and out of operative position with relation to said housing, and a plurality of parts secured to said housing forming means for supporting films thereon in different planes and arranged to remain in normal film supporting position when the lens holder is swung out of operative position.

21. In a device of the class described, a lamp housing, means for supporting stereoscopic films thereon, pivot means on said housing, a frame pivoted on said means, a lens housing pivoted on said frame for a tilting movement about an axis transverse to the plane of the film, and a latch on said housing for engaging said frame to operatively position the lens housing with relation to said film supporting means.

22. In a device of the class described, the combination of an incandescent electric light source, a film holding means, a frame having a pair of stereoscopic lens elements for viewing films on said holding means before said light source, said frame being rotatable about an axis substantially parallel to the axes of the lens elements and transverse to the plane of the film, and a light diffusing color screen between said light source and film holding means for simulating the effect of daylight.

23. In stereoscopic apparatus, a device for holding image bearing material or the like, a second device for affording stereoscopic vision of the images, supporting means for said devices on which one is arranged for movement relative to the other as a unit about an axis, and in a plane substantially parallel thereto from a nonimage combining position to a position at which the images are seen as one, a lamp reflector associated with said image bearing device and having a lamp therein and light diffusing means between the lamp and the image holding device.

24. In stereoscopic apparatus, a device for holding image bearing material or the like, a second device for affording stereoscopic vision of the images, supporting means for said devices on which one is movable relative to the other as a unit about an axis transverse to the plane of the image from a nonimage combining position to a position at which the images are seen as one, focusing means for the second device, illuminating means, and light diffusing means between the illuminating means and said holding device.

25. In stereoscopic apparatus, a support, a device upon the support for holding image bearing material or the like, a plate disposed opposite said support, and a second device for affording stereoscopic vision of the images including spaced lens elements mounted for a rotary movement upon said plate as a unit about an axis lying between said elements from a nonimage combining position to a position at which the images are seen as one.

26. In stereoscopic apparatus, a support, a device upon the support for holding image bearing material or the like, a plate disposed opposite said support and pivoted to swing thereon, and a second device for affording stereoscopic vision of the images mounted upon said plate to rotate as a unit about an axis substantially at a right angle thereto whereby to permit movement of said second device from a nonimage combining position in its normal plane of operation to a position at which the images are seen as one.

27. In stereoscopic apparatus, a support, a housing thereon having a light source therein, a device opposite the light source for holding image bearing material, a supporting member adjacent said device, a pivot member carried by said supporting member and a second device for affording stereoscopic vision of the images mounted for a turning movement about the axis of said pivot member from a nonimage combining position to a position at which the images are seen as one.

ALPHONSE F. PIEPER.
GEORGE I. KESTER.